Patented Sept. 20, 1932

1,877,854

UNITED STATES PATENT OFFICE

MAX HAGEDORN, OF DESSAU IN ANHALT, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ELASTIC PRODUCT

No Drawing. Application filed September 12, 1929, Serial No. 392,242, and in Germany September 13, 1928.

The present invention relates to new highly elastic products and to a process of manufacturing them. More particularly it relates to elastic products which are made from esters of polymeric carbohydrates containing besides one or more radicals of saturated or unsaturated fatty acids radicals of saturated or unsaturated cyclic substituted fatty acids. These mixed esters of polymeric carbohydrates have, in addition to the mechanical properties of plastic extensibility and capacity for being moulded which are possessed by other carbohydrate derivatives, an elasticity at high temperature which is much in excess of that of hitherto known cellulose derivatives and this elasticity persists at room temperature and even in the cold.

As saturated or unsaturated fatty acid forming a substituent in the molecule of the polymeric carbohydrate there may be selected those with any desired length of simple or branched carbon chains, with any desired number and position of double linkings and with any desired number and kind of acyclic substituents, such as halogen, unsubstituted or substituted hydroxyl-groups, ethyleneoxide-groups, CNS-, $NH_2$-, or organo-metallic-groups.

Preferably I use a polymeric carbohydrate derivative of an acid having more than 10 carbon atoms in its molecule. I enumerate for instance the following acids which may be esterified with the carbohydrate: acetic acid, butyric acid, stearic acid, palmitic acid, isovaleric acid, crotonic acid, oleic acid, linoleic acid, dibrom-oleic acid, bromocrotonic acid, lactic acid, aminobutyric acid and so on. As saturated or unsaturated cyclic substituted fatty acids forming another substituent in the polymeric carbohydrate molecule there may be used acids of the type of phenylacetic acid or of naphthenic acid, and in particular all fatty acids of the previously stated kind so far as they contain as substituents saturated or unsaturated carbocyclic or heterocyclic rings with any desired number of atoms, as for instance phenylacetic acid, naphthenic acid, cyclopentane acetic acid, 9-phenylstearic acid, cyclohexane butyric acid, cinnamic acid. The various acid radicals may be introduced into the carbohydrate molecule by any known process suitable for esterifying polymeric carbohydrates, for instance by treating a carbohydrate with a corresponding chloride, anhydride, amide, or ester of the acid which is to be esterified with the carbohydrate, if necessary, in the presence of an acid-binding substance (see for instance U. S. application Ser. No. 186,566, filed April 25, 1927, and U. S. application Ser. No. 323,200, filed December 1, 1928).

The highly elastic carbohydrate derivatives made according to the invention can be worked by any process suitable for working rubber, guttapercha or balata, particularly by calendering and vulcanizing. By addition of sulfur the known vulcanization effects are obtained, while at the same time the stickiness of the cellulose mixed esters, which is particularly noticeable at high temperatures, is diminished.

The products unite in themselves the properties of rubber, guttapercha and balata; they withstand the action of acids, alkalies and atmospheric oxygen; they can be moulded both in the form of solutions at low temperatures and without the use of solvents at 80–100° C. and have a considerable elastic extensibility which is markedly independent of the temperature. Thus, for instance, bands may be obtained having a length of 10 centimeters and a width of 3 centimeters and a thickness of 5–1500 $\mu$ showing a tenacity of 5–30 kg. per 10 mm.$^2$ and an extensibility of 100–400 per cent. In consequence they may be used for all purposes for which rubber, guttapercha or balata has hitherto been used. They are particularly suitable for making plates of any desired thickness, thin films, threads, insulating masses, impregnating masses, coating masses and the like.

The products may be worked up either alone or mixed with coloring matters, other derivatives of polymeric carbohydrates, added rubber, guttapercha, balata or depolymerization products and derivatives of these, or their synthetic substitutes, like hydrogenized caoutchouc, halogenized caoutchouc, butadiene caoutchouc. Furthermore, I may add esters having a high boiling point and preferably esters of such acids which are substituents in the carbohydrate derivatives.

The new products may be regenerated in the manner usual for rubber, guttapercha or balata.

The following examples illustrate the invention, the parts being by weight:—

*Example 1.*—90 parts of cellulose-naphthenate-oleate are intimately mixed at a temperature of 90–100° C. with 10 parts of sulfur in a kneading machine and then heated in a suitable mould for 3 hours under a pressure of 140° C. In this manner there is obtained, for example, a highly elastic plate of 0.3 cm. thickness.

*Example 2.*—Starch-naphthenate-oleate-stearate, with or without added matter of the kind herein referred to, is rolled at 100° C. into thin skins or a solution of 15 per cent strength of this ester in a suitable solvent, such as carbon tetrachloride, is poured in known manner to produce films. The thin skins or films thus made are vulcanized cold, either by immersing them in a solution of 10 per cent strength of sulfur chloride in petroleum ether or by exposing them for a short time to vapor of sulfur chloride and then washing them in an alkaline bath. In this manner there may be made, for example, elastic skins of 100–200 μ thickness.

*Example 3.*—85 parts of cellulose phenylacetate-oleate-laurate are carefully mixed with 15 parts of sulfur in a kneading apparatus and then further worked up by the process of Example 1.

What I claim is:—

1. Products having the properties of rubber, gutta-percha and balata, withstanding the action of acids, alkalies and atmospheric oxygen, being moldable, having a considerable elastic extensibility markedly independent of the temperature, and comprising a vulcanized polymeric carbohydrate ester containing in its molecule the radical of an acid of the group consisting of saturated and unsaturated, substituted and unsubstituted aliphatic acids, and of a second acid of the group consisting of saturated and unsaturated cyclic substituted fatty acids, both acids being directly combined with the carbohydrate.

2. Products having the properties of rubber, guttapercha and balata, withstanding the action of acids, alkalies and atmospheric oxygen, being moldable, having a considerable elastic extensibility markedly independent of the temperature, and comprising a vulcanized polymeric carbohydrate ester containing in its molecule the radical of an organic acid containing more than 10 carbon atoms of the group consisting of saturated and unsaturated fatty acids and, furthermore, esterified by naphthenic acid, both acids being directly combined with the carbohydrate.

3. The process which comprises calendering and vulcanizing in the manner usual for rubber, guttapercha and balata an ester of a polymeric carbohydrate which contains besides a radical of an organic acid of the group consisting of saturated and unsaturated, substituted and unsubstituted fatty acids a radical of an organic acid of the group consisting of saturated and unsaturated cyclic substituted fatty acids, both acids being directly combined with the carbohydrate.

4. The process which comprises calendering and vulcanizing in the manner usual for rubber, guttapercha and balata an ester of a polymeric carbohydrate which contains besides a radical of an organic acid having more than 10 carbon atoms the radical of naphthenic acid, both acids being directly combined with the carbohydrate.

5. The process which comprises vulcanizing a product which comprises a polymeric carbohydrate ester which contains besides the radical of an organic acid of the group consisting of saturated and unsaturated, substituted and unsubstituted fatty acids the radical of an organic acid of the group consisting of saturated and unsaturated cyclic substituted fatty acids, both acids being directly combined with the carbohydrate.

6. The process which comprises vulcanizing a product which comprises a polymeric carbohydrate ester which contains besides the radical of an organic acid having more than 10 carbon atoms in its molecule of the group consisting of saturated and unsaturated fatty acids the radical of naphthenic acid, both acids being directly combined with the carbohydrate.

7. The process which comprises mixing cellulose-naphthenate-oleate with sulfur at a temperature of 90° to 100° C. and vulcanizing the mixture at 140° C.

8. The process which comprises vulcanizing products consisting of starch-naphthenate-oleate-stearate in the cold with sulfur chloride.

9. The process which comprises mixing cellulose-phenylacetate-oleate-laurate with sulfur and vulcanizing the mixture at 140° C.

In testimony whereof, I affix my signature.

MAX HAGEDORN.